2 Sheets--Sheet 1.

WILLIAM PEACOCK.
Improvement in Potato-Diggers.

No. 127,640. Patented June 4, 1872.

2 Sheets--Sheet 2.

WILLIAM PEACOCK.
Improvement in Potato-Diggers.

No. 127,640. Patented June 4, 1872.

Witnesses.
Fred Haynes
R. I. Rabeau

Wm Peacock

UNITED STATES PATENT OFFICE.

WILLIAM PEACOCK, OF NEW YORK, N. Y.

IMPROVEMENT IN POTATO-DIGGERS.

Specification forming part of Letters Patent No. 127,640, dated June 4, 1872.

Specification describing an Improved Potato Harvester, Sorter, and Loader, invented by WILLIAM PEACOCK, of the city, county, and State of New York.

This invention consists in a novel arrangement of a shovel, a system of screens and carriers, and a partitioned box and frame for supporting the same, whereby the potatoes are dug, separated from the earth taken up with them, and sorted. It also consists in a novel construction of the shovel, whereby it can be adjusted to dig different depths.

Figure 1:
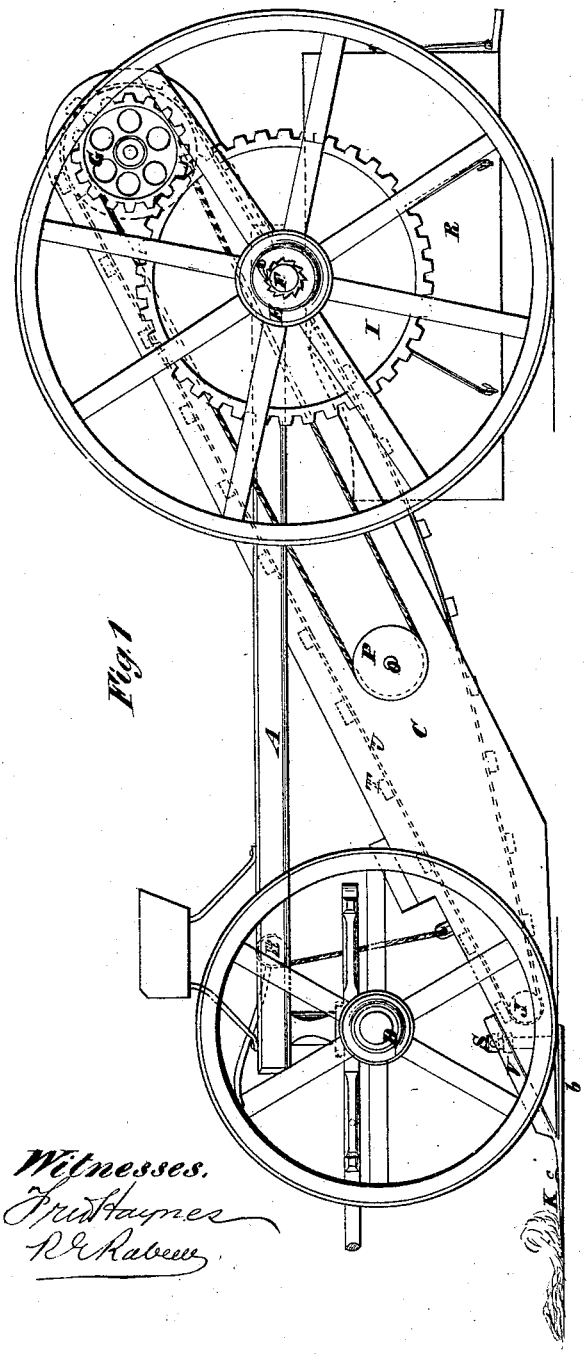
Figure 2:
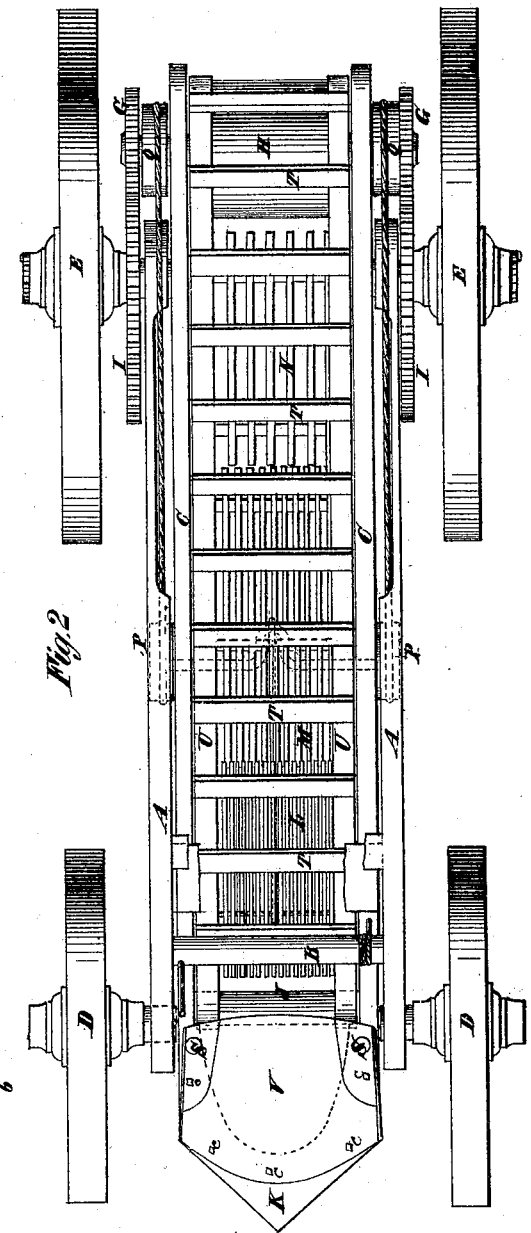
Figure 3:
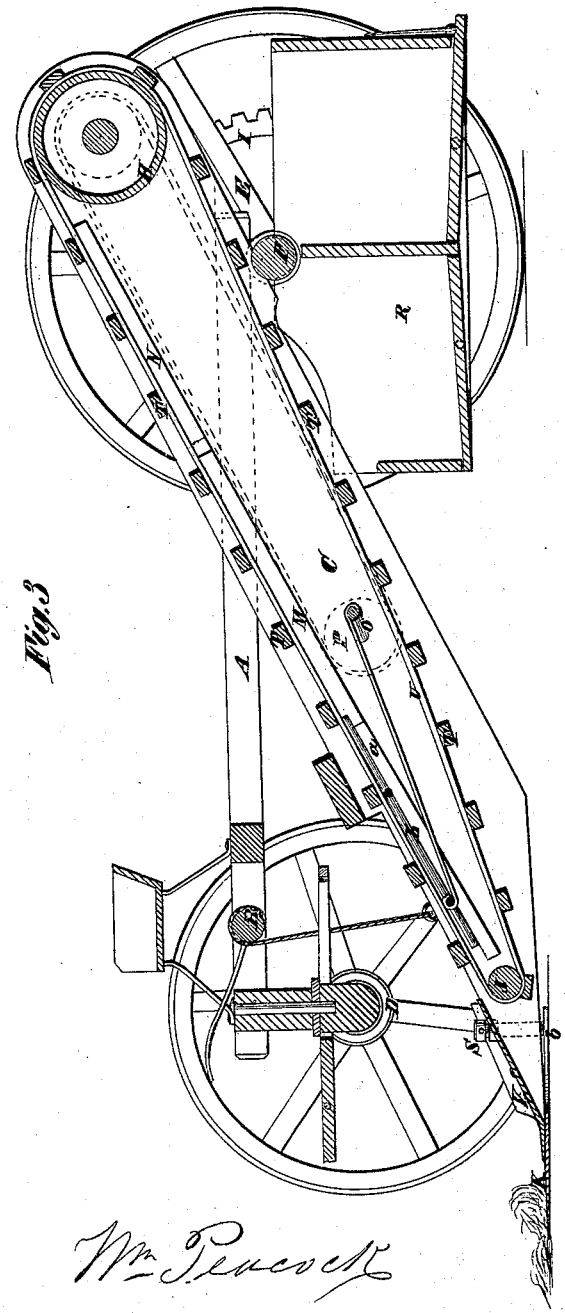

In the accompanying drawing, Figure 1 is a side view of my machine. Fig. 2 is a plan of the same; and Fig. 3 is a central longitudinal section thereof.

Similar letters of reference indicate corresponding parts in all the figures.

A is a carriage, consisting of a frame supported on two pairs of wheels, D E, with the forward pair, D, of which, it is connected in the ordinary manner by a king-bolt, to provide for turning. The forward portion of said frame is provided with a seat for the driver, and has pivoted under it a windlass, B, which is operated by a lever manipulated by the driver. C is the frame proper of the machine, supported at the rear end of the axle F of the hind wheels, which is the driving-axle, and having the shovel attached to its forward end. Just behind the shovel it has secured to it a rope or chain that passes round the windlass, and is wound or unwound to raise or lower the frame. The shovel consists of two steel plates, which are riveted together at c c. The lower plate, K, may be termed the share, and has formed on it two elastic heels, b b, which fit under the end of the frame. The upper plate, V, may be termed the mold-board, and has its side edges turned up to facilitate the carrying up of the earth and potatoes. Two set-screws, S S, which screw through the frame and impinge against the elastic heels b b, provide for the adjustment of the shovel to dig to a greater or less depth, the depth being diminished by depressing the two pieces riveted together. I provide for the renewal of that portion termed the share, which is soonest worn out. Near the rear end of this frame there is pivoted a large drum, H, whose journals project beyond said frame, and are provided with small gears or pinions G G, which are driven by large gear-wheels I I on the driving-shaft. Pivoted to the forward part of the frame near the shovel is a small drum, J, over which and the drum H there passes an elevator of ladder-like construction, consisting of two endless belts or chains, U, having attached a series of wooden cross-bars or carriers, T T, which push the potatoes dug by the shovel before them onto the screens, the lower of which, L, is a reciprocating shaking-screen for separating the earth from the potatoes, and the upper two, M and N, are for sorting them. The said screen L is supported on cleats or slides a a, and is given a reciprocating shaking motion by means of a connecting-rod and crank on a shaft, O, which is provided at its ends with pulleys P P, that are driven by a belt from pulleys Q Q on the driving-shaft. The other screens, M N, are rigidly secured on the cleats a a, and are of different degrees of coarseness, so as to sort different-sized potatoes into different compartments of the receiving-box R, the small ones passing through the larger screen into one compartment, and the large ones between the end of the screen and the drum H into another. The said receiving-box R is suspended from the driving-shaft F, and divided into two compartments, the bottom of each of which is so hinged as to be capable of opening in a rearward direction. In practice, I shall lock the wheels E to their shaft F by a pawl and ratchet, or an equivalent device, as shown in Figs. 1 and 2, so that the wheels will not operate the axle in backing, but will when running forward, unless for some reason thrown out of operation.

The machine is operated by simply drawing it over the ground. The earth and potatoes taken up by the forward motion of the machine are carried up by the carriers onto and up the shaking-screen L, where the earth is separated from the potatoes and a portion of it dropped through the screen onto the ground. The potatoes and remaining dirt are then carried up by the cross-bars of the carrier over the screen M, which further insures the sifting out of the dirt and any stones which might not have passed through the shaking-screen. They are then carried over the screen N, through which the smaller ones pass into the forward compartment of the box R, and the larger ones are carried past the end of the screen and drop between it and the roller H into the rear compartment of said box. When the box is full the frame C is raised by the windlass B, and the machine drawn to any suitable place, and the bottom of the box let down and thereby emptied.

Claims.

1. The combination of the inclined frame C, shovel K, reciprocating shaking-screen L, stationary screens M N, endless chain of carriers U T, and receiving-boxes, substantially as shown and described.

2. The shovel, constructed with a share, K, mold-board V, and vertically-elastic heels $b$, and fitted with adjusting-screws S, for the purpose of adjusting its operation, substantially as herein set forth.

WM. PEACOCK.

Witnesses:
  FRED. HAYNES,
  R. E. RABEAU.